United States Patent
Izuta et al.

(10) Patent No.: US 11,490,060 B2
(45) Date of Patent: Nov. 1, 2022

(54) IMAGE PROCESSING DEVICE, IMAGE PROCESSING METHOD, AND IMAGING DEVICE

(71) Applicant: SONY CORPORATION, Tokyo (JP)

(72) Inventors: Osamu Izuta, Tokyo (JP); Takeshi Nishida, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/250,465

(22) PCT Filed: May 16, 2019

(86) PCT No.: PCT/JP2019/019512
§ 371 (c)(1),
(2) Date: Jan. 25, 2021

(87) PCT Pub. No.: WO2020/026561
PCT Pub. Date: Feb. 6, 2020

(65) Prior Publication Data
US 2021/0168345 A1    Jun. 3, 2021

(30) Foreign Application Priority Data
Aug. 1, 2018  (JP) .............................. JP2018-144935

(51) Int. Cl.
*H04N 9/73* (2006.01)
*H04N 5/235* (2006.01)

(52) U.S. Cl.
CPC .......... *H04N 9/735* (2013.01); *H04N 5/2354* (2013.01)

(58) Field of Classification Search
CPC .......... H04N 9/735; H04N 5/225; H04N 5/30; H04N 9/07; H04N 9/73; H04N 9/04; H04N 17/02
See application file for complete search history.

(56) References Cited

U.S. PATENT DOCUMENTS

| | | | |
|---|---|---|---|
| 2006/0159336 A1* | 7/2006 | Uezono .................. | H04N 9/735 382/167 |
| 2006/0170789 A1* | 8/2006 | Takahashi .............. | H04N 9/735 348/223.1 |

(Continued)

FOREIGN PATENT DOCUMENTS

| | | |
|---|---|---|
| CN | 102238306 A | 11/2011 |
| JP | 2004-165932 A | 6/2004 |

(Continued)

OTHER PUBLICATIONS

International Search Report and Written Opinion of PCT Application No. PCT/JP2019/019512, dated Jul. 9, 2019, 10 pages of ISRWO.

*Primary Examiner* — Abdelaaziz Tissire
(74) *Attorney, Agent, or Firm* — Chip Law Group

(57) ABSTRACT

An imaging unit 23 generates an image signal of a captured image. An optical sensor unit 25 generates a sensor signal that has a wider view angle than that of the imaging unit 23 and is according to a spectral characteristic upon obtaining the captured image. A controller 50 determines reliability of a light-source estimation result based on the image signal generated by the imaging unit 23, using a light-source estimation result based on the sensor signal generated by the optical sensor unit 25. For example, the controller 50 classifies the light-source estimation result based on the image signal into categories of light sources capable of being estimated based on the sensor signal, and compares the category into which the light-source estimation result is classified with the light source estimated based on the sensor signal. In a case where the light source estimated based on the sensor signal is not changed when the category into which the light-source estimation result is classified is changed, it is determined that the light-source estimation result based on the image signal is not reliable, and an (Continued)

adjustment value of white balance adjustment is not updated. Then, the white balance adjustment can accurately and stably be performed.

12 Claims, 10 Drawing Sheets

(56) References Cited

U.S. PATENT DOCUMENTS

| | | | | |
|---|---|---|---|---|
| 2008/0068468 | A1* | 3/2008 | Kitajima | H04N 9/735 |
| | | | | 348/E9.051 |
| 2009/0033762 | A1* | 2/2009 | Abe | G03B 7/09979 |
| | | | | 348/E5.031 |
| 2009/0295947 | A1* | 12/2009 | Komiya | H04N 9/735 |
| | | | | 348/234 |
| 2010/0020193 | A1* | 1/2010 | Zhang | G06T 5/009 |
| | | | | 382/167 |
| 2018/0309940 | A1* | 10/2018 | Okada | H04N 9/44 |
| 2020/0213494 | A1* | 7/2020 | Park | H04N 9/73 |

FOREIGN PATENT DOCUMENTS

| | | |
|---|---|---|
| JP | 2005-303400 A | 10/2005 |
| JP | 2008-72575 A | 3/2008 |
| JP | 2009-296102 A | 12/2009 |
| JP | 2011-223452 A | 11/2011 |
| JP | 2015-228546 A | 12/2015 |
| JP | 2016-111475 A | 6/2016 |
| JP | 2017-123502 A | 7/2017 |
| WO | 2016/088293 A1 | 6/2016 |

* cited by examiner

| LIGHT SOURCE CAPABLE OF BEING ESTIMATED BASED ON IMAGE SIGNAL |
|---|
| SUNLIGHT (SUNSHINE) |
| SUNLIGHT (SHADE) |
| SUNLIGHT (CLOUDINESS) |
| ELECTRIC BULB-COLORED LIGHT SOURCE |
| WHITE LIGHT SOURCE |
| NEUTRAL WHITE LIGHT SOURCE |
| DAYLIGHT COLOR LIGHT SOURCE |
| MERCURY LAMP |

FIG. 4A

| LIGHT SOURCE CAPABLE OF BEING DETECTED BASED ON SENSOR SIGNAL |
|---|
| NATURAL LIGHT |
| NON-NATURAL LIGHT |

| CATEGORY | SUNLIGHT (SUNSHINE) | SUNLIGHT (SHADE) | SUNLIGHT (CLOUDINESS) | ELECTRIC BULB-COLORED LIGHT SOURCE | WHITE LIGHT SOURCE | NEUTRAL WHITE LIGHT SOURCE | DAYLIGHT COLOR LIGHT SOURCE | MERCURY LAMP |
|---|---|---|---|---|---|---|---|---|
| LIGHT SOURCE CAPABLE OF BEING ESTIMATED BASED ON IMAGE SIGNAL | NATURAL LIGHT | | | NON-NATURAL LIGHT | | | | |
| LIGHT SOURCE CAPABLE OF BEING DETECTED BASED ON SENSOR SIGNAL | NATURAL LIGHT | | | | NON-NATURAL LIGHT | | | |

FIG. 7

| POSITION | PS1 | PS2 | PS3 | PS4 | PS5 | PS6 |
|---|---|---|---|---|---|---|
| L1 | SUNSHINE | SUNSHINE | SUNSHINE | WHITE ILLUMINATION | WHITE ILLUMINATION | WHITE ILLUMINATION |
| LC1 | NATURAL LIGHT | NATURAL LIGHT | NATURAL LIGHT | NON-NATURAL LIGHT | NON-NATURAL LIGHT | NON-NATURAL LIGHT |
| L2 | NATURAL LIGHT | NATURAL LIGHT | NATURAL LIGHT | NATURAL LIGHT | NATURAL LIGHT | NATURAL LIGHT |
| LIGHT SOURCE OF WHITE BALANCE ADJUSTMENT | SUNSHINE | SUNSHINE | SUNSHINE | SUNSHINE | SUNSHINE | SUNSHINE |

FIG. 10

| POSITION | PS21 | PS22 | PS23 | PS24 | PS25 | PS26 |
|---|---|---|---|---|---|---|
| L1 | ELECTRIC BULB-COLORED ILLUMINATION | ELECTRIC BULB-COLORED ILLUMINATION | SUNSHINE | SUNSHINE | SUNSHINE | SUNSHINE |
| LC1 | NON-NATURAL LIGHT | NON-NATURAL LIGHT | NATURAL LIGHT | NATURAL LIGHT | NATURAL LIGHT | NATURAL LIGHT |
| L2 | NON-NATURAL LIGHT | NON-NATURAL LIGHT | NON-NATURAL LIGHT | NATURAL LIGHT | NATURAL LIGHT | NATURAL LIGHT |
| LIGHT SOURCE OF WHITE BALANCE ADJUSTMENT | ELECTRIC BULB-COLORED ILLUMINATION | ELECTRIC BULB-COLORED ILLUMINATION | ELECTRIC BULB-COLORED ILLUMINATION | SUNSHINE | SUNSHINE | SUNSHINE |

IMAGE PROCESSING DEVICE, IMAGE PROCESSING METHOD, AND IMAGING DEVICE

CROSS REFERENCE TO RELATED APPLICATIONS

This application is a U.S. National Phase of International Patent Application No. PCT/JP2019/019512 filed on May 16, 2019, which claims priority benefit of Japanese Patent Application No. JP 2018-144935 filed in the Japan Patent Office on Aug. 1, 2018. Each of the above-referenced applications is hereby incorporated herein by reference in its entirety.

TECHNICAL FIELD

This technique relates to an image processing device, an image processing method, a program, and an imaging device, and enables stable performance of more accurate white balance adjustment.

BACKGROUND ART

Conventionally, in an imaging device, white balance adjustment is performed using a control value according to a light source upon imaging, such as the sun or a fluorescent lamp. For example, in PTL 1, a captured image is divided into a plurality of block regions, to perform the white balance adjustment according to a color temperature estimated based on an infrared amount detected in each block region. Further, in PTL 2, an optical sensor whose imaging range is equal to an imaging range of an imaging element is used, and using a control value for color correction calculated based on a first photoelectric conversion signal obtained by photoelectrically converting subject light by the imaging element having a first spectral sensitivity characteristic, and a second photoelectric conversion signal obtained by photoelectrically converting the subject light by the optical sensor having a second spectral sensitivity characteristic, white balance adjustment of the first photoelectric conversion signal is performed.

CITATION LIST

Patent Literature

[PTL 1]
  Japanese Patent Laid-open No. 2015-228546
[PTL 2]
  Japanese Patent Laid-open No. 2017-123502

SUMMARY

Technical Problems

Incidentally, in a case where the white balance adjustment is performed based on subject light of the captured image or the imaging range, a range of a background captured in the captured image is largely changed depending on a difference in view angle. In a case where a moving object is imaged, with a narrow view angle, the background captured in the captured image is largely changed. Therefore, there is a risk in which the white balance adjustment varies due to the change of the background captured.

Therefore, an object of this technique is to provide an image processing device, an image processing method, a program, and an imaging device capable of stably performing more accurate white balance adjustment.

Solution to Problems

A first aspect of this technique is an image processing device including a white balance setting unit that sets a white balance adjustment value of an image signal of a captured image generated by photoelectrically converting light from a subject by an imaging element using a light-source estimation result based on the image signal, and a light-source estimation result based on a sensor signal generated by an optical sensor unit upon obtaining the captured image, the optical sensor unit having a wider view angle than that of the captured image and having spectral sensitivity in a region different from that of the imaging element.

In this technique, the white balance setting unit classifies the light-source estimation result based on the image signal generated by photoelectrically converting the light from the subject by the imaging element into categories of light sources capable of being estimated based on the sensor signal generated by the optical sensor unit that detects a spectral characteristic of an imaging environment. The optical sensor unit has a wider view angle than that of the captured image and has spectral sensitivity in a region different from that of the imaging element. For example, the optical sensor unit has a view angle that includes the view angle of the captured image, has a wider view angle than that of the captured image, and has sensitivity in at least an infrared region. The white balance setting unit determines reliability of the light-source estimation result based on the image signal from a comparison result between the classified category and the light source estimated based on the sensor signal. In a case where the imaging element successively generates a plurality of image signals of each image, the determination of reliability of the light-source estimation result based on the image signal is performed with respect to a light-source estimation result based on a second image signal or following image signals from among the plurality of image signals. Further, the determination of the reliability of the light-source estimation result based on the image signal may be performed in a case where a difference between a view angle of an imaging optical system and the view angle of the optical sensor unit is equal to or greater than a predetermined value. In the determination of the reliability of the light-source estimation result based on the image signal, the white balance setting unit does not update the white balance adjustment value, determining that the light-source estimation result based on the image signal is not reliable in a case where, when, for example, the category after the classification is changed, the light source estimated based on the sensor signal is not changed to be a light source that is equal to the changed category. Further, the white balance setting unit sets the adjustment value of the white balance adjustment according to the light-source estimation result based on the image signal, determining that the light-source estimation result based on the image signal is reliable in a case where the category after the classification is equal to the light source estimated based on the sensor signal. Further, in a case where the reliability of the light-source estimation result based on the image signal is not determined, the white balance setting unit sets the adjustment value of the white balance adjustment according to the light-source estimation result based on the image signal. A white balance adjustment unit that performs the white balance adjustment to the image signal based on the white balance adjustment value may further be provided. In a case where the view angle of the captured image is wider than the view angle of the sensor signal by a predetermined value or more due to optical zooming, the white balance setting unit may set the white balance adjustment value using the light-source estimation result based on the image signal and the light-source estimation result based on the sensor signal.

A second aspect of this technique is an image processing method including setting, by a white balance setting unit, a white balance adjustment value of an image signal of a captured image generated by photoelectrically converting light from a subject by an imaging element using a light-source estimation result based on the image signal, and a light-source estimation result based on a sensor signal generated by an optical sensor unit upon obtaining the captured image, the optical sensor unit having a wider view angle than that of the captured image and having spectral sensitivity in a region different from that of the imaging element.

A third aspect of this technique is a program causing a computer to perform white balance adjustment, the program causing the computer to perform a procedure of obtaining a light-source estimation result based on an image signal of a captured image generated by photoelectrically converting light from a subject by an imaging element, a procedure of obtaining a light-source estimation result based on a sensor signal generated by an optical sensor unit upon obtaining the captured image, the optical sensor unit having a wider view angle than that of the captured image and having spectral sensitivity in a region different from that of the imaging element, and a procedure of setting a white balance adjustment value of the image signal using the light-source estimation result based on the image signal, and the light-source estimation result based on the sensor signal.

Note that the program according to the present technique is a program that can be provided to, for example, a general-purpose computer capable of executing various program codes by a recording medium that provides in a computer-readable format, such as an optical disc, a magnetic disc, or semiconductor memory, or a communication medium such as a network. Such a program is provided in the computer-readable format, thereby implementing a process according to the program on the computer.

A fourth aspect of this technique is an imaging device including an imaging unit that generates an image signal of a captured image by photoelectrically converting light from a subject, an optical sensor unit that has a wider view angle than that of the captured image and has spectral sensitivity in a region different from that of the imaging element, a white balance adjustment unit that performs white balance adjustment of the image signal generated by the imaging unit, and a white balance setting unit that sets a white balance adjustment value of the image signal using a light-source estimation result based on the image signal of the captured image, and a light-source estimation result based on a sensor signal generated by the optical sensor unit upon obtaining the captured image.

Advantageous Effect of Invention

According to this technique, the white balance adjustment value of the image signal is set using the light-source estimation result based on the image signal of the captured image generated by photoelectrically converting the light from the subject by the imaging element, and the light-source estimation result based on the sensor signal generated by the optical sensor unit upon obtaining the captured image, the optical sensor unit having a wider view angle than that of the captured image and having spectral sensitivity in a region different from that of the imaging element. Accordingly, the white balance adjustment can be performed more accurately and stabler than a case where the white balance adjustment value is set based on only the light-source estimation result based on the image signal. Note that effects described in the present specification are merely illustrative and are not limited.

Additional effects may be provided.

BRIEF DESCRIPTION OF DRAWINGS

FIGS. 2A, 2B, and 2C depict graphs illustrating a spectral characteristic and spectral sensitivity.

[FIGS. 4A and 4B]

FIGS. 4A and 4B are diagrams illustrating light sources capable of being detected.

FIG. 5 is a diagram illustrating a categorizing process.

FIG. 7 is a diagram illustrating light-source estimation results of the specific example.

FIG. 10 is a diagram illustrating light-source estimation results of the still another specific example.

DESCRIPTION OF EMBODIMENT

Hereinafter, an embodiment according to the present technique will be described. Note that the description will be made in the following order.
  1. Configuration of Imaging Device
  2. Operation of Imaging Device
  3. Modifications <1. Configuration of Imaging Device>

Figure 1:
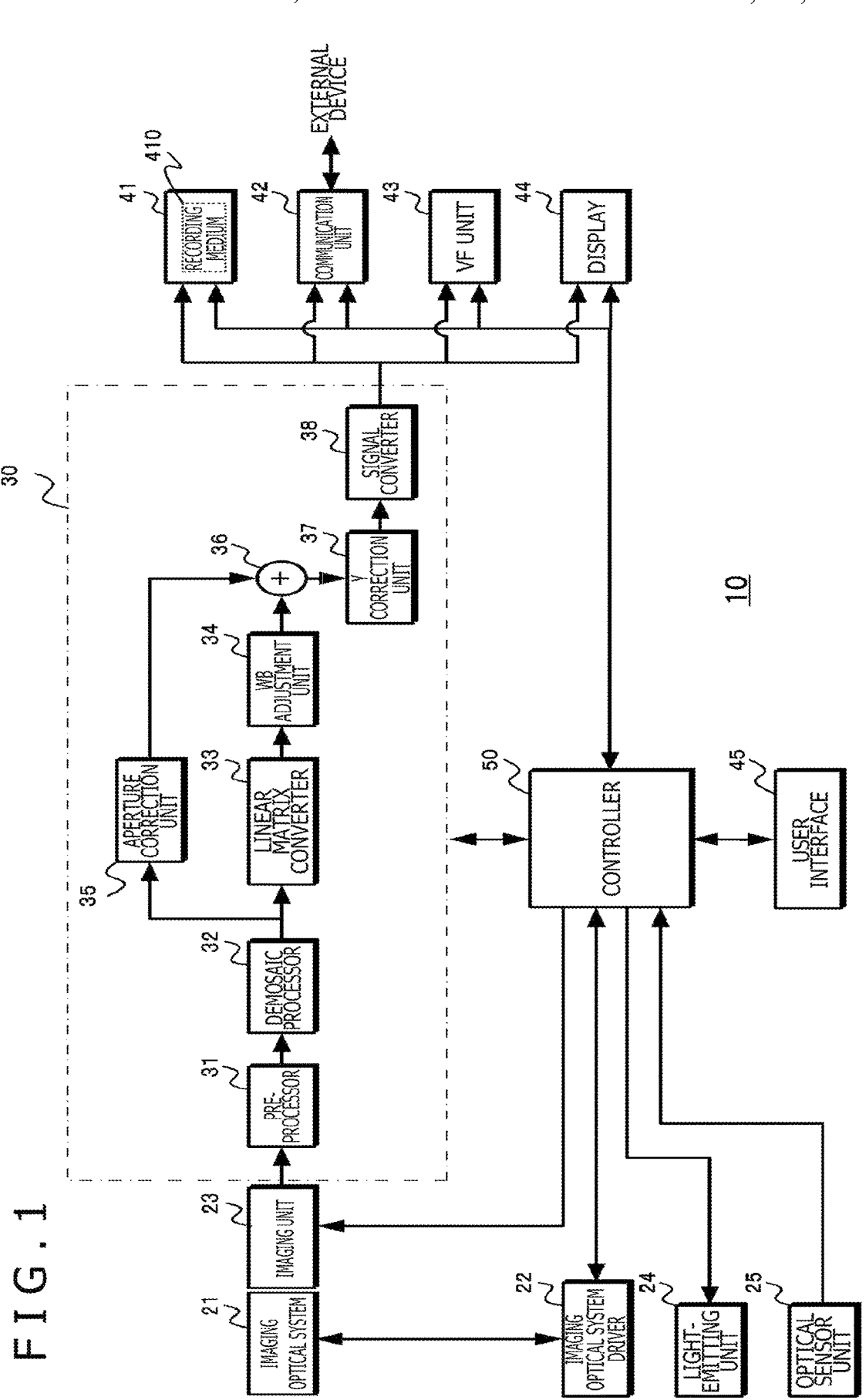
FIG. 1 is a diagram illustrating a configuration of an imaging device.

FIG. 1 illustrates a configuration of an imaging device according to the present technique. An imaging device 10 includes an imaging optical system 21, an imaging optical system driver 22, an imaging unit 23, a light-emitting unit 24, an optical sensor unit 25, an image processor 30, a recording unit 41, a communication unit 42, a view finder (VF) 43, a display 44, a user interface 45, and a controller 50.

The imaging optical system 21 is configured using, for example, a focus lens and a zoom lens. The imaging optical system 21 drives, for example, the focus lens and the zoom lens based on a drive signal from the imaging optical system driver 22, to form an optical image of a subject on an imaging surface of the imaging unit 23. Alternatively, the imaging optical system 21 may be provided with, for example, an iris (diaphragm) mechanism and a shutter mechanism to drive the respective mechanisms based on the drive signal from the imaging optical system driver 22. Alternatively, the imaging optical system 21 may output setting information indicating a lens position and an iris position to the imaging optical system driver 22 or the controller 50. Alternatively, the imaging optical system 21 may be detachable to allow use of the imaging optical system 21 having different optical characteristics.

The imaging unit 23 is configured using an imaging element such as a CMOS (Complementary Metal Oxide Semiconductor) or a CCD (Charge Coupled Device). The imaging unit 23 performs photoelectric conversion with an imaging element having a spectral characteristic according to a visible light region, that is, spectral sensitivity in the visible light region in light from the subject, to generate an image signal of the captured image, which is RAW data. The imaging unit 23 outputs the generated image signal to the image processor 30. Further, the light-emitting unit 24 emits illumination light based on a control signal from the controller 50.

The optical sensor unit 25 generates a sensor signal using a sensor having a spectral characteristic according to an imaging environment including a non-visible light region, that is, spectral sensitivity in the non-visible light region in light from the subject, the sensor having spectral sensitivity different from that of the imaging element in the imaging unit 23. The optical sensor unit 25 has a view angle serving as a sensing range that includes the view angle of the captured image obtained by the imaging unit 23 and is a wider view angle than that of the captured image. The optical sensor unit 25 outputs, to the controller 50, the sensor signal generated according to the spectral characteristic in the view angle upon imaging.

Figure 2A:
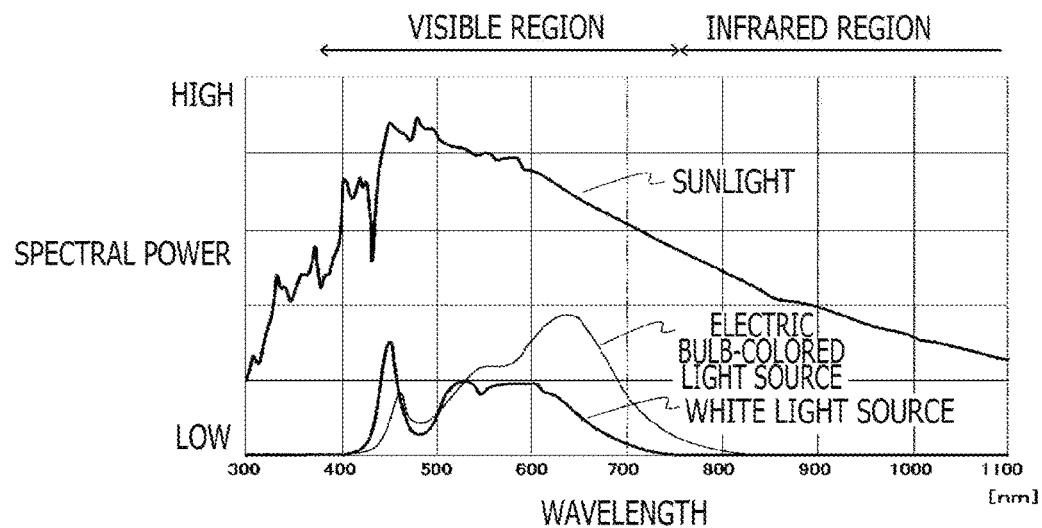
[FIGS. 2A, 2B, and 2C]
Figure 2B:
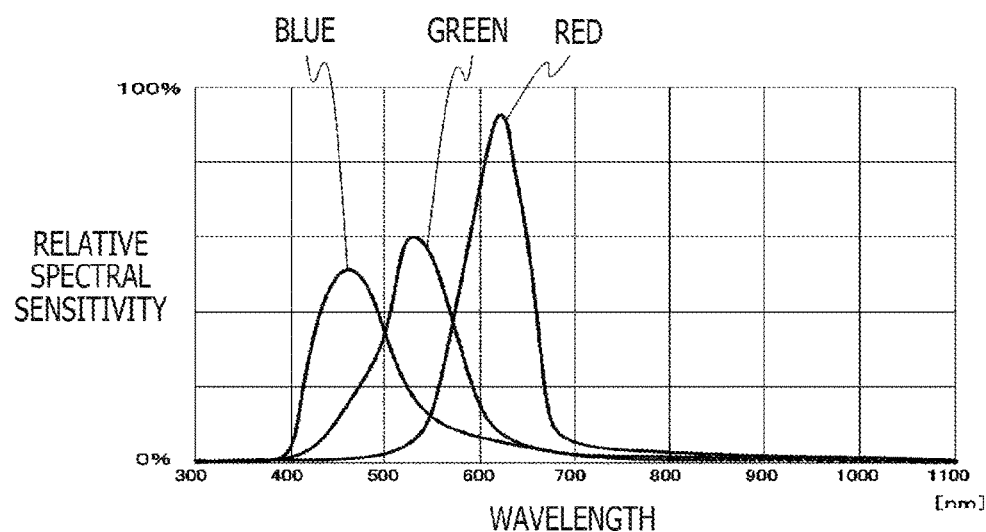
Figure 2C:
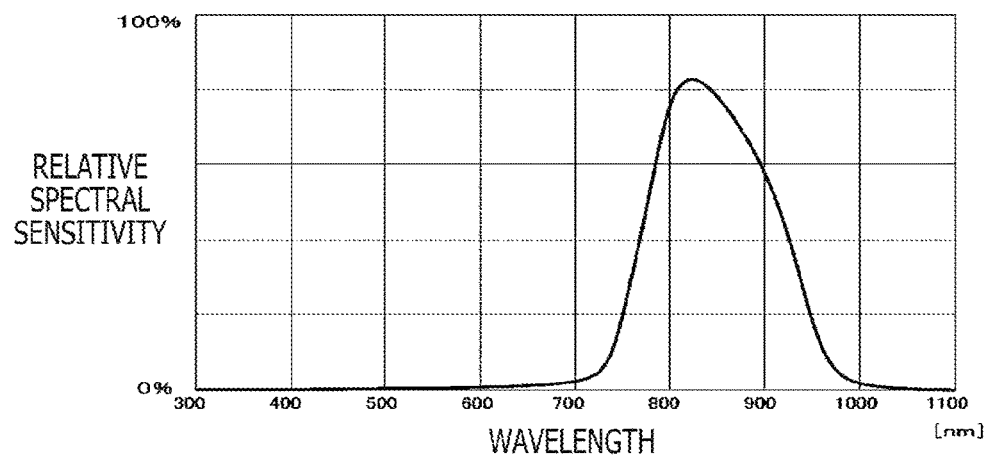

FIGS. 2A, 2B, and 2C illustrate the spectral characteristic and the spectral sensitivity. Note that part FIG. 2A illustrates spectral characteristics of light sources, part of FIG. 2B illustrates the spectral sensitivity of the imaging element used in the imaging unit 23, and part FIG. 2C illustrates spectral sensitivity of the sensor used in the optical sensor unit 25.

As illustrated in part FIG. 2A, for example, natural light (sunlight) and non-natural light (e.g., a white light source or an electric bulb-colored light source) are different in power in an infrared region. The imaging unit 23 has sensitivity in a red region, a blue region, and a green region, for example, and generates an image signal of three primary colors including red, green, and blue. As illustrated in part FIG. 2C, the optical sensor unit 25 has sensitivity in at least the infrared region for allowing discrimination between the natural light and the non-natural light illustrated in part (a) of FIG. 2A based on the sensor signal. Further, when the optical sensor unit 25 has sensitivity in the visible region in addition to the infrared region, discrimination between the white light source and the electric bulb-colored light source, for example, can also be performed.

The imaging unit 23 has sensitivity in, for example, the red region, blue region, and green region, and therefore can finely classify the light source based on the image signal. However, when the view angle is narrow and, for example, the background captured in the captured image is largely changed, a light-source estimation result is changed even when the light source is not changed as described later, in some cases. Further, since the optical sensor unit 25 is wider in view angle than the imaging unit 23, the optical sensor unit 25 can more easily obtain the light-source estimation result corresponding to the light source in comparison with the light-source estimation result based on the image signal. However, the estimation of the light source based on the sensor signal generated by the optical sensor unit 25 cannot finely classify the light source in comparison with the light source estimation based on the image signal. Then, the image processor 30 stably performs more accurate white balance adjustment using the light-source estimation result based on the image signal and the light-source estimation result based on the sensor signal.

The image processor 30 includes a pre-processor 31, a demosaic processor 32, a linear matrix converter 33, a white balance (WB) adjustment unit 34, an aperture correction unit 35, a signal adder 36, a γ correction unit 37, and a signal converter 38.

The pre-processor 31 performs, for example, a noise removal process, a gain adjustment process, an analog-to-digital conversion process, and a defective pixel correction on the image signal generated by the imaging unit 23. The pre-processor 31 outputs the processed image signal to the demosaic processor 32.

The demosaic processor 32 performs a demosaic process using the image signal that is the RAW data, the image signal being processed by the pre-processor 31, to generate an image signal whose one pixel represents color components, for example, an image signal of three primary colors, from the image signal whose one pixel represents one color component. The demosaic processor 32 outputs the generated image signal to the linear matrix converter 33 and the aperture correction unit 35. Note that the demosaic process is an example of a color separation process, and in a case where an imaging element including, for example, a stripe color filter, which is other than a mosaic color filer, is used, a color separation process of a different system is performed.

The linear matrix converter 33 performs a matrix operation of the image signal output from the demosaic processor 32, generates an image signal having a target color tone, and outputs the image signal to the white balance adjustment unit 34.

The white balance adjustment unit 34 corrects unbalance between colors due to, for example, a difference of the light source. The white balance adjustment unit 34 performs gain adjustment, based on an adjustment value supplied from the controller 50, to the image signal of three primary colors including, for example, red, green, and blue, which is output from the linear matrix converter 33, thereby enabling color balance of a neutral color portion of the subject to be reproduced as a neutral color. The white balance adjustment unit 34 outputs the processed image signal to the signal adder 36.

The aperture correction unit 35 performs, for example, extraction of high-frequency components from the image signal supplied from the demosaic processor 32 and level adjustment of the extracted signal, generates a contour correction signal, and outputs the generated signal to the signal adder 36.

The signal adder 36 adds the contour correction signal supplied from the aperture correction unit 35 to the image signal supplied from the white balance adjustment unit 34, generates an image signal on which a contour correction process has been performed, and outputs the image signal to the γ correction unit 37.

The γ correction unit 37 performs γ correction of the image signal supplied from the signal adder 36 and outputs the corrected image signal to the signal converter 38.

The signal converter 38 converts the γ-corrected image signal into a signal according to image recording. For example, the signal converter 38 converts the γ-corrected image signal of three primary colors into a luminance signal and a color difference signal, and then performs an encoding process, to output resultant data to the recording unit 41. Further, the signal converter 38 performs a decoding process on a signal supplied from the recording unit 41 and converts a luminance signal and a color difference signal thus obtained into an image signal of three primary colors. Moreover, in a case where the image signal is output to an external device, the signal converter 38 converts the γ-corrected image signal of three primary colors into a signal suitable for communication. For example, the signal converter 38 converts the γ-corrected image signal of three primary colors into the luminance signal and the color difference signal, encodes the converted signals, and outputs the encoded data to the communication unit 42. Furthermore, the signal converter 38 converts the γ-corrected image signal or the image signal obtained by performing, for example, decoding of the signal supplied from the recording unit 41 into an image signal according to display resolution of the view finder 43 or the display 44. The signal converter 38 outputs the resolution-converted image signal to the view finder 43 or the display 44.

A recording medium 410 is fixedly or detachably provided to the recording unit 41. The recording unit 41 stores the encoded signal supplied from the signal converter 38 into the recording medium 410. Further, the recording unit 41 reads the signal recorded in the recording medium 410 and outputs the signal to the signal converter 38.

The communication unit 42 communicates with the external device and outputs the signal supplied from, for example, the signal converter 38 to the external device. Further, the communication unit 42 outputs a communication signal supplied from the external device to the controller 50.

The view finder 43 and the display 44 are configured using, for example, a liquid crystal display element or an organic EL display element. The view finder 43 and the display 44 display the captured image obtained by the imaging unit 23 or the captured image recorded in the recording medium 410, based on the image signal supplied from the signal converter 38. Further, the view finder 43 and the display 44 display, for example, various setting screens and various information such as functions and operations of the imaging device 10 based on a display signal supplied from the controller 50.

The user interface 45 includes, for example, an operation switch, an operation button, an operation dial, and a remote control signal receiver, generates an operation signal according to a user operation, and outputs the operation signal to the controller 50.

The controller 50 includes, for example, a CPU (Central Processing Unit), a ROM (Read Only Memory), and a RAM (Random Access Memory). The ROM (Read Only Memory) stores various programs to be executed by the CPU (Central Processing Unit). The RAM (Random Access Memory) stores information such as various parameters. The CPU executes the various programs stored in the ROM and controls each unit such that the imaging device 10 performs operations according to the user operation or a request from the external device based on, for example, the operation signal from the user interface 45 or the communication signal from the external device which is received by the communication unit 42.

Further, the controller 50 performs light source estimation based on the image signal before the white balance process. For the light source estimation based on the image signal, various existing techniques can be used. For example, as described in Japanese Patent Laid-open No. 2004-165932, the controller 50 performs an operation, on sensor response values, which allows colorimetric approximation from a known spectral sensitivity characteristic of an imaging unit and an assumed spectral characteristic of a test light source, projects the sensor response values into an evaluation space independent of a light source upon imaging, and evaluates correctness of a plurality of test light sources based on a distributed state of sample values of the projected scene, thereby estimating the light source. Alternatively, the controller 50 may detect signal components to estimate the light source based on the detection result or may estimate the light source from a distribution of color signals.

Further, the controller 50 performs light source estimation based on the sensor signal supplied from the optical sensor unit 25. For example, as is obvious from the spectral characteristics of the light sources illustrated in FIGS. 2A, 2B, and 2C, the natural light (sunlight) and the non-natural light (e.g., the white light source or the electric bulb-colored light source) are different in power from each other in the infrared region. Accordingly, when an optical sensor unit having sensitivity in the infrared region is used, whether the light source is the natural light or the non-natural light can be discriminated according to a signal level of the sensor signal. Further, as the optical sensor unit, when a plurality of sensitivity regions is provided in the visible region, based on, for example, a difference in power between respective sensitivity regions in the sensor signal from the optical sensor unit, for example, a difference between a ratio of a blue component to a green component and a ratio of a red component to the green component, the white light source and the electric bulb-colored light source can also be discriminated.

Further, the controller 50 performs control of the white balance adjustment of the image signal using a light-source estimation result based on the image signal of the captured image and a light-source estimation result based on the sensor signal upon obtaining the captured image, to perform accurate white balance adjustment. For example, in a case where the imaging unit 23 successively generates a plurality of image signals of each image, the controller 50 uses the light-source estimation result based on the sensor signal to determine whether the light-source estimation result based on a second image signal or following image signals from among the plurality of image signals is a reliable light-source estimation result. Further, the controller 50 determines an adjustment value of the white balance adjustment based on the reliable light-source estimation result and outputs the determined adjustment value to the white balance adjustment unit 34, thereby allowing stable performance of the accurate white balance adjustment. Alternatively, in a case where a difference between the view angle of the captured image and the view angle of the optical sensor unit 25 is equal to or greater than a predetermined value, that is, the view angle of the optical sensor unit 25 is wider than the view angle of the captured image by the predetermined value or more, the controller 50 may determine whether the light-source estimation result based on the image signal is reliable. Herein, the predetermined value can be considered that the view angle of the optical sensor unit 25 is at least wider than the view angle of the captured image, or that the view angle of the optical sensor unit 25 is wider than the view angle of the captured image by a preset ratio or more. Note that setting of the adjustment value of the white valance adjustment based on the light-source estimation result based on the image signal, the light-source estimation result based on the sensor signal, and a use determination result of the light-source estimation result based on the image signal may be performed by the white balance adjustment unit 34 instead of the controller 50.

The imaging device 10 is not limited to the configuration illustrated in FIG. 1, may include a configuration not illustrated in FIG. 1, or may be a configuration in which a part of the configuration illustrated in FIG. 1 is excluded. For example, the imaging unit 23 may be provided with an imaging element for each color component of three primary colors. In this case, the demosaic processor 32 is not necessary to be provided. Furthermore, the imaging device 10 may have a function for recording, for example, the RAW data or the light-source detection result into the recording medium 410 and a function for transmitting the RAW data or the light-source detection result to the external device.

<2. Operation of Imaging Device>

Figure 3:
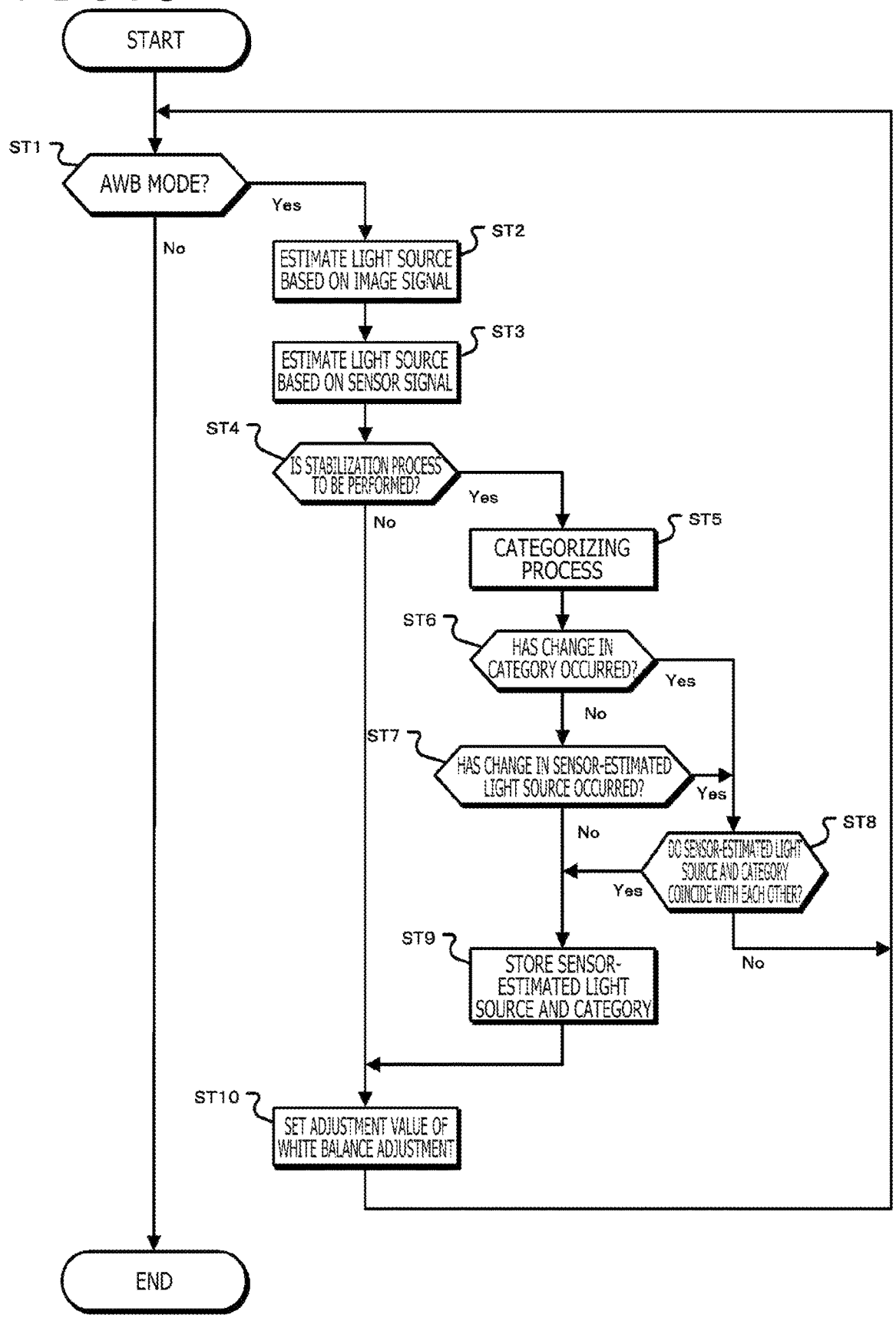
FIG. 3 is a flowchart illustrating a white balance control operation.

FIG. 3 is a flowchart illustrating a white balance control operation of the imaging device. In step ST1, the controller determines whether an automatic white balance (AWB) mode is set. In a case where operation setting of the imaging device 10 is set to the automatic white balance mode, the controller 50 proceeds to step ST2, and in a case where the operation setting of the imaging device 10 is not set to the automatic white balance mode, the controller 50 does not perform the white balance control operation, and ends. Note that a process loop from step ST1 to step ST10 is performed every update period unit of the white balance adjustment, for example, per frame or per multiple frames.

In step ST2, the controller performs the light source estimation based on the image signal. The controller 50 estimates the light source based on the image signal before the white balance process, and proceeds to step ST3.

In step ST3, the controller performs the light source estimation based on the sensor signal. The controller 50 estimates the light source based on the sensor signal supplied from the optical sensor unit 25, and proceeds to step ST4. Note that the light source estimated based on the sensor signal is also referred to as a sensor-estimated light source.

In step ST4, the controller determines whether a stabilization process is to be performed. In a case where an operation mode for obtaining a plurality of imaging images, for example, a moving image mode or a consecutive imaging mode is set, and second imaging or following imaging from start of photographing is to be performed, the controller 50 determines that the stabilization process is to be performed. In other words, the stabilization process is performed on a captured image (frame) to be imaged after a first captured image (frame). The stabilization process may always be performed, but may not always be performed. For example, in a case where the image is not recorded, the stabilization process may be omitted. It is desirable to perform the stabilization process in a case where at least one of the imaging device itself or the external device that is wiredly or wirelessly connected to the imaging device and receives the image from the imaging device itself to record the image records the image. Accordingly, in a case where only a through image is displayed, and the captured image is not recorded, the stabilization process may be omitted. Further, when the stabilization process is made to be performed in a case where the difference between the view angle of the captured image and the view angle of the optical sensor unit 25 is equal to or greater than the predetermined value, the controller 50 is allowed not to perform the stabilization process in a case where the view angle of the captured image is made wider by optical zooming, and a variation in white balance adjustment depending on a change of the background to be captured may not occur. In a case where it is determined to perform the stabilization process, the controller 50 proceeds to step ST5, and in a case where it is determined not to perform the stabilization process, for example, in a case where first imaging in the moving image mode or the consecutive imaging mode, or a single imaging mode is set, the controller 50 proceeds to step ST10.

In step ST5, the controller performs a categorizing process. The controller 50 classifies the light source estimated based on the image signal in step ST2 into one of categories of light sources capable of being estimated by the light source estimation in step ST3, and proceeds to step ST6.

In step ST6, the controller determines whether a change in category has occurred. In a case where the category classified in step ST5 is equal to a category previously stored in step ST9 described later, the controller 50 determines that the change in category has not occurred, and proceeds to step ST7. In a case where the category classified in step ST5 is different from the category previously stored in step ST9 described later, the controller 50 determines that the change in category has occurred, and proceeds to step ST8.

In step ST7, the controller determines whether a change in sensor-estimated light source has occurred. In a case where the sensor-estimated light source estimated based on the sensor signal in step ST3 has changed from a sensor-estimated light source previously stored in step ST9 described later, the controller 50 proceeds to step ST8. In a case where the sensor-estimated light source estimated based on the sensor signal in step ST3 has not changed from the sensor-estimated light source previously stored in step ST9 described later, the controller 50 proceeds to step ST9.

In step ST8, the controller determines whether the sensor-estimated light source and the category coincide with each other. The controller 50 determines whether the sensor-estimated light source estimated based on the sensor signal in step ST7 of the current process loop is equal to the category of the light source based on the image signal, which is classified by the categorizing process in step ST5 of the current process loop. In a case where it is determined that the sensor-estimated light source is equal to the category, the controller 50 determines that the light-source estimation result based on the image signal is reliable, and proceeds to step ST9. In a case where it is determined that the sensor-estimated light source is not equal to the category, the controller 50 determines that the light-source estimation result based on the image signal is not reliable, and returns to step ST1. Herein, by returning from step ST8 to step ST1, the process in step ST10 is not performed in the current process loop. This stabilizes the white balance estimation and the white balance adjustment.

In step ST9, the controller stores the sensor-estimated light source and the category. The controller 50 stores (overwrites) information indicating the sensor-estimated light source and the category such that the change in category in step ST6 and the change in sensor-estimated light source in step ST7 can be determined using information indicating the sensor-estimated light source and the category when the adjustment value of the white balance adjustment is set the last time in the past, when the processes in steps ST6 and ST7 are repeated thereafter, and proceeds to step ST10.

In step ST10, the controller updates the adjustment value of the white balance adjustment by setting the adjustment value of the white balance adjustment. For example, in a case where the stabilization process is not performed based on, for example, an instruction from a user, in a case where the stabilization process is not performed because the single imaging mode, that is, a still image photographing mode that photographs only one still image is set, or in a case where the category of the light-source estimation result based on the image signal is not changed, the controller 50 sets the adjustment value of the white balance adjustment, according to the light-source estimation result based on the image signal in the current process loop, that is, in the process in ST2 performed immediately before. Further, in a case where the category of the light-source estimation result based on the image signal is changed, and it is determined that the light-source estimation result based on the image signal is reliable, that is, in a case where the category of the light-source estimation result based on the image signal is equal to the light-source estimation result based on the sensor signal, the controller 50 sets the adjustment value of the white balance adjustment, according to the light-source estimation result based on the image signal in the process in ST2 performed immediately before. Note that in a case where after the stabilization process is performed, the category of the light-source estimation result based on the image signal is changed, but it is determined that the light-source estimation result based on the image signal is not reliable, the controller 50 proceeds from the above-described process in step ST8 to the process in step ST1, and does not perform the process in step ST9, whereby a value before the change in category is held as the adjustment value of the white balance adjustment. With this configuration, stabilization of the white balance estimation and the white balance adjustment can be achieved. The controller 50 outputs the generated adjustment value to the white balance adjustment unit 34 and returns to step ST1. With this configuration, the white balance adjustment unit 34 performs the white balance adjustment to the image signal based on the adjustment value output from the controller 50.

In short, in a case where the stabilization process is performed, the controller 50 newly sets the adjustment value of the white balance adjustment based on the light-source estimation result based on the image signal in step ST2 in the current process loop, only in a case where both the sensor-estimated light source and the category are changed, and changed results coincide with each other. In other cases, the controller 50 uses the adjustment value of the white balance adjustment, which has been set before. This stabilizes the white balance estimation and the adjustment value of the white balance adjustment.

Further, the white balance control operation of the imaging device is not limited to process order illustrated in FIG. 3. For example, in a case where the light source estimated in step ST2 or step ST3 is changed, the processes from step ST5 to step ST9 may be performed. In other words, the process in step ST4 may be eliminated.

Next, a specific example of the control operation of the white balance adjustment will be described. FIGS. 4A and 4B illustrates detectable light sources. Part FIG. 4A illustrates light sources detectable based on the image signal, and part FIG. 4B illustrates light sources detectable based on the sensor signal. For example, the controller 50 can discriminate sunshine, shade, and cloudiness, under sunlight, and an electric bulb-colored light source, a white light source, a neutral white light source, a daylight color light source, and a mercury lamp, based on the image signal. Further, the controller 50 can discriminate the natural light and the non-natural light based on the sensor signal. Note that, as illustrated in part FIG. 4A and part FIG. 4B, in general, kinds of light sources detectable based on the image signal are larger in number than kinds of light sources detectable based on the sensor signal.

FIG. 5 illustrates the categorizing process performed by the controller 50, and the light sources illustrated in part FIG. 4A are categorized into the light sources illustrated in part FIG. 4B. For example, the "sunshine, shade, and cloudiness, under sunlight" that are light sources detectable based on the image signal are categorized into a category of the natural light, and the "electric bulb-colored light source, white light source, neutral white light source, daylight color light source, and mercury lamp" are categorized into a category of the non-natural light. This categorizing process is performed to absorb a difference between the light source capable of being estimated based on the image signal and the light source capable of being estimated based on the sensor signal.

Figure 6:
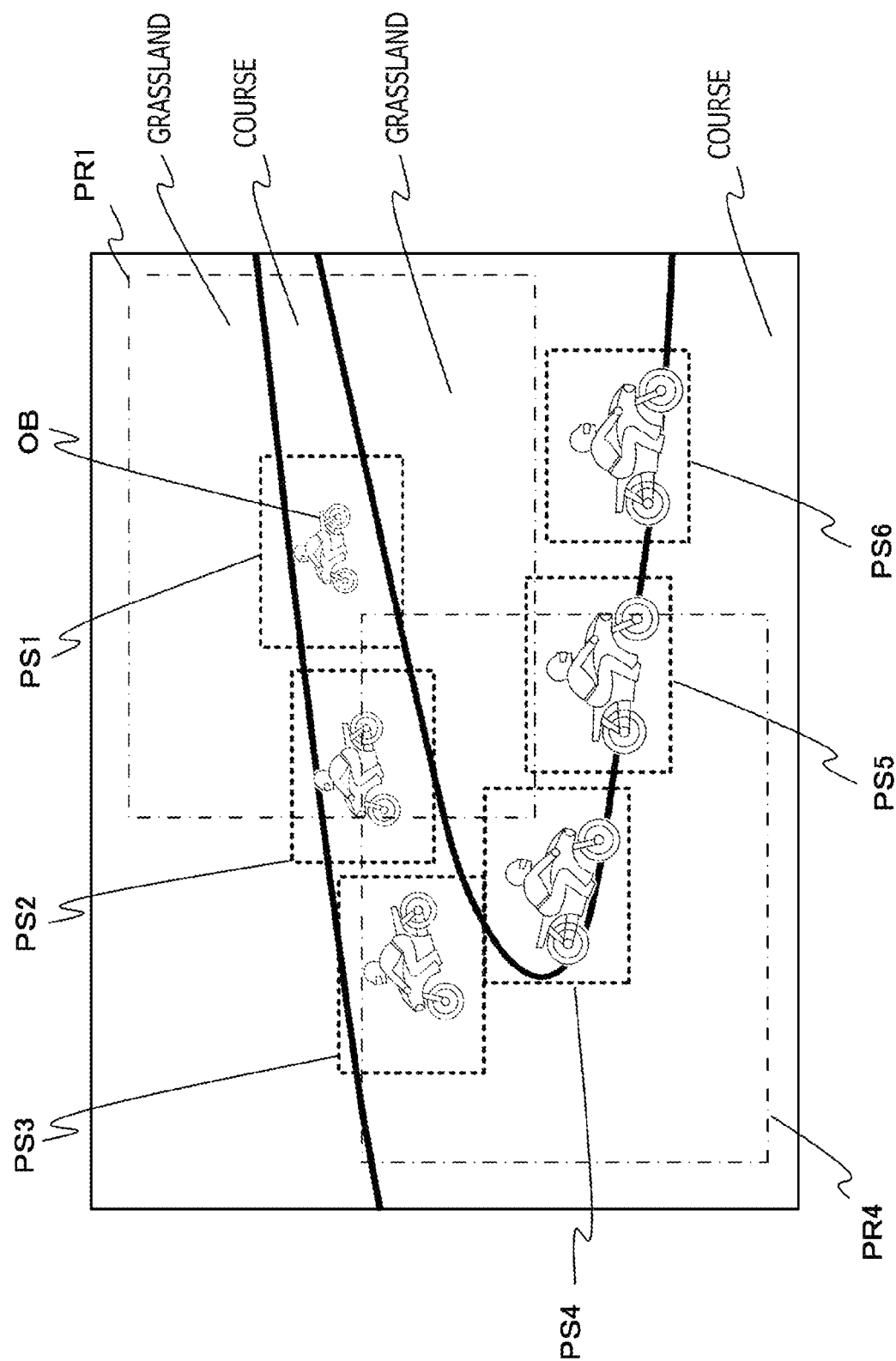
FIG. 6 is a diagram illustrating a specific example of a control operation of white balance adjustment.

FIG. 6 illustrates a specific example of the control operation of the white balance adjustment and is a case where a motorbike in a race track is imaged, for example. A motorbike OB is running on a course, and an imaging direction of the imaging device 10 is moved according to movement of the motorbike Oft thereby obtaining a plurality of images by imaging each region indicated by a broken line at positions PS1 to PS6, for example. Further, the view angle of the optical sensor unit 25 is a range PR1 indicated by an alternate long and short dash line at the position PS1, and is a range PR4 indicated by an alternate long and short dash line at the position PS4, for example. The view angle of the optical sensor unit 25 is a view angle that includes the view angle of the captured image obtained by the imaging unit 23 and is wider than that of the captured image. As illustrated in part FIG. 2C, the optical sensor unit 25 has sensitivity in at least the infrared region. The view angle of the optical sensor unit 25 includes the view angle of the captured image obtained by the imaging unit 23 and is wider than that of the captured image. Even when the view angle of the optical sensor unit 25 is, for example, either one of the range PR1 and the range PR4, a light source L2 detected based on the sensor signal is discriminated as the "natural light."

FIG. 7 illustrates light-source estimation results of the specific example illustrated in FIG. 6. Note that, in FIG. 7, it is defined that the light source detected based on the image signal is a light source L, the light source detected based on the sensor signal is the light source L2, and the category of the light source L1 detected by performing the categorizing process of the light source L1 is a category LC1. Further, it is assumed that the weather is fine, the course is paved by, for example, asphalt, and a portion excluding the course is grassland. Moreover, when the grassland is green and is largely included in the imaging range, even the sunshine under sunlight may mistakenly be estimated as the white light source in the light source estimation.

At the positions PS1 to PS3, the motorbike OB, the course, and the grassland are included in the imaging range indicated by the broken line, and a ratio of the course is large. In this case, it is discriminated that the light source L1 detected based on the image signal is the "sunshine," and the light source L2 detected based on the sensor signal is the "natural light." Further, the category LC1 is determined as the "natural light" since the light source L1 is the "sunshine." At the positions PS1 to PS3, the light source L2 and the category LC1 coincide with each other. Accordingly, the controller 50 determines that the estimation result of the light source L1 is reliable, sets the adjustment value of the white balance adjustment while defining the estimation result of the light source L, that is, the light source as the "sunshine," and outputs the set adjustment value to the white balance adjustment unit 34, to perform the white balance adjustment.

After that, it is assumed that at the position PS4, a ratio of the grassland increases in the imaging range, and the light source L1 detected based on the image signal is changed from the "sunshine" to the "white illumination," for example. Since the light source L1 is the "white illumination," the category LC1 is determined as the "non-natural light." In a case where the category LC1 of the light source L1 is changed in this manner, and in a case where the light source L2 is not also changed to the same light source as the category LC, it is determined that the light-source estimation result of the light source L1 is not reliable, and the adjustment value of the white balance adjustment is not modified. Also at the positions PS5 and PS6, similarly to at the position PS4, when the light source L1 is estimated as the "white light source," the category LC of the light source L1 and the light source L2 are still different from each other. Therefore, it is determined that the estimation result of the light source L1 is not reliable, and the adjustment value of the white balance adjustment is not modified. Accordingly, according to the present technique, even when the light source L1 estimated at the positions PS4 to PS6 is changed from the light source L1 estimated at the positions PS1 to PS3, the white balance adjustment is performed using the adjustment value before the change in category regardless of the estimation result of the light source L. Therefore, the imaging device 10 can stably perform the white balance adjustment. Further, in a case where it is determined that the light-source estimation result based on the image signal is reliable, the white balance adjustment is performed according to the light-source estimation result based on the image signal, whereby the white balance adjustment that is more accurate than the case where the light-source estimation result based on the sensor signal is used can be performed.

Figure 8:
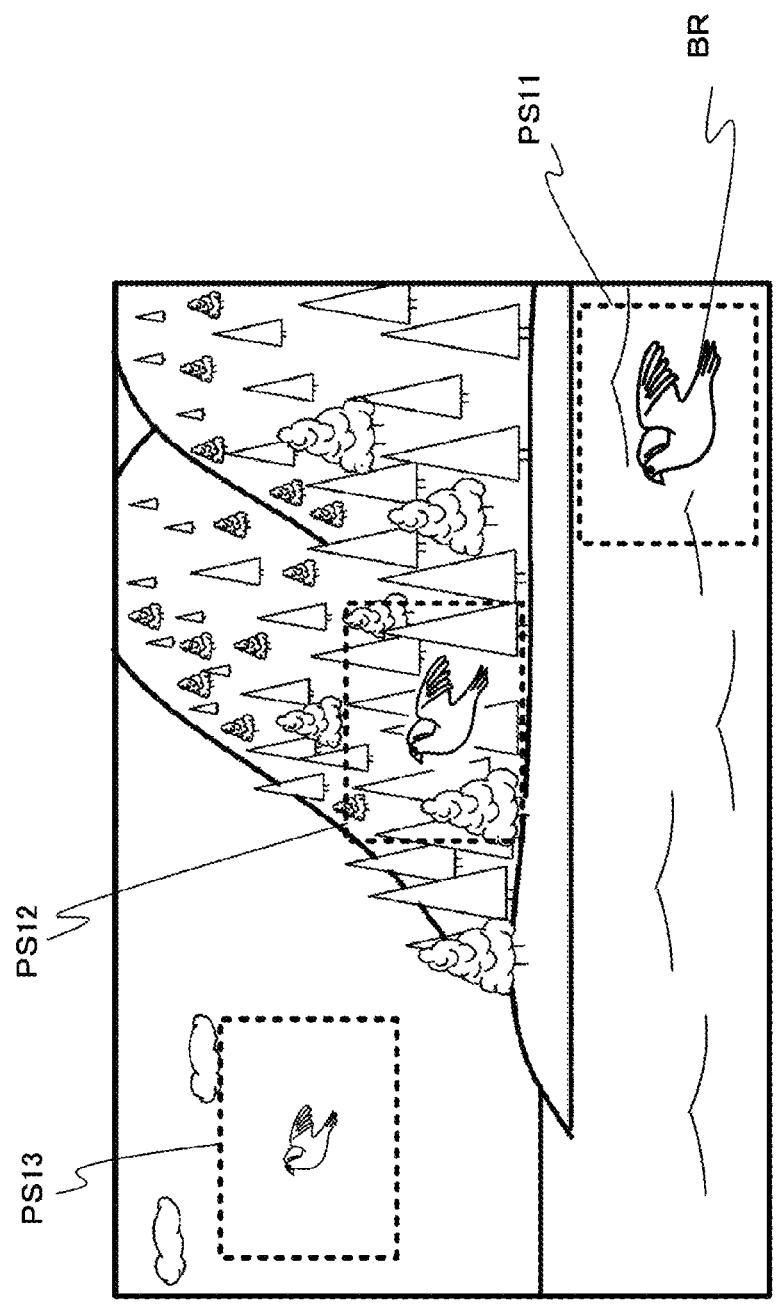
FIG. 8 is diagram illustrating another specific example.

FIG. 8 illustrates another specific example. For example, in a case where a direction of the imaging device 10 is moved according to movement of a white bird BR, and a plurality of images is successively obtained by imaging inside regions indicated by broken lines, the background is different between the positions PS11 to PS13. For example, the background at the position PS11 is "sea," the background at the position PS12 is a "mountain," and the background at the position PS13 is "sky." In such a case, when the adjustment value is set based on the image signal, a color of the bird BR may mistakenly be changed to be reddish white or bluish white, for example, depending on the difference in background. However, according to the present technique, in a case where it is determined that the light-source estimation result based on the image signal is not reliable, the adjustment value can be held in a state before a change in light-source estimation result, whereby the color of the bird BR can be prevented from being changed due to the difference in background.

Figure 9:
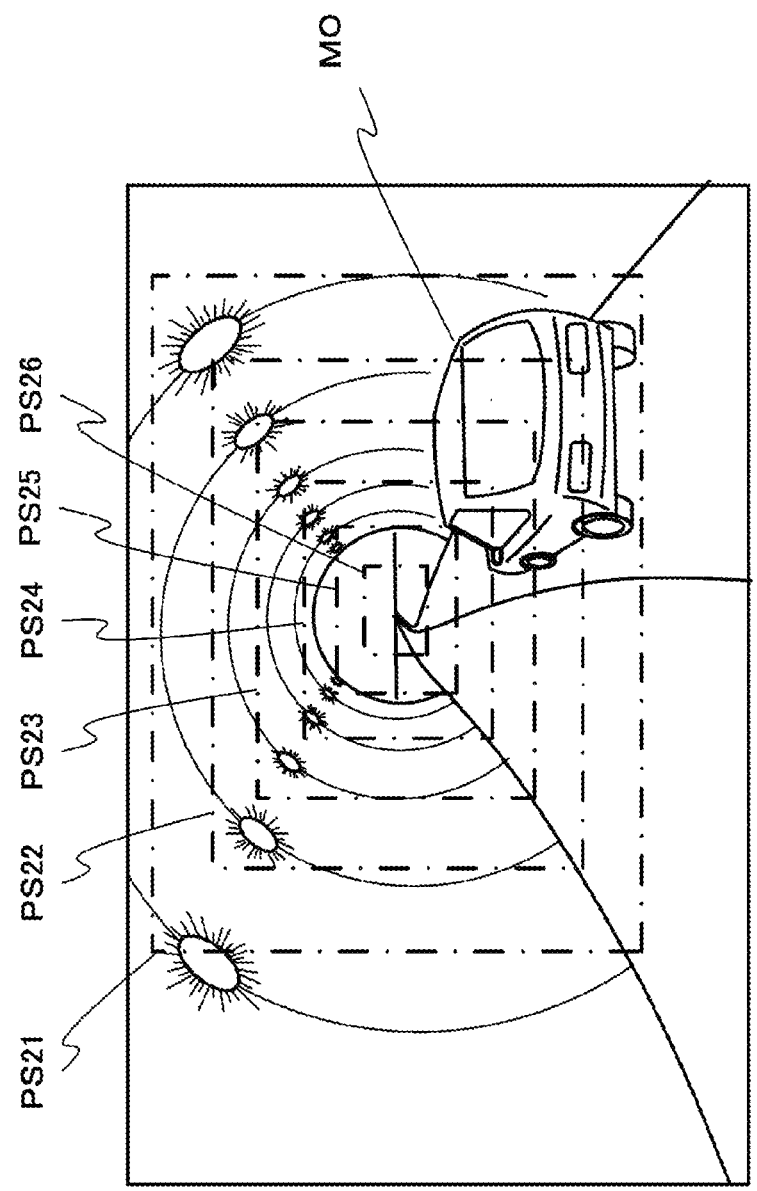
FIG. 9 is a diagram illustrating still another specific example of the control operation of the white balance adjustment.

FIG. 9 illustrates still another specific example of the control operation of the white balance adjustment and is a case where a vehicle MO traveling inside a tunnel images the front, for example. The vehicle MO attached with the imaging device 10 whose view angle is fixed with respect to the vehicle MO is traveling from the inside of the tunnel where electric bulb-colored illumination is performed, toward the outside of the tunnel, where the weather is fine. According to movement of the vehicle MO, a view angle region indicated by an alternate long and short dash line of the optical sensor unit 25 is moved, and a plurality of images is obtained by imaging at positions PS21 to PS26, for example. Note that, although the view angle of the imaging unit 23 is not illustrated in FIG. 9, the view angle of the imaging unit 23 is set as a range narrower than the view angle of the optical sensor unit 25.

FIG. 10 illustrates light-source estimation results of the still another specific example illustrated in FIG. 9. Note that, in FIG. 10, it is defined that the light source detected based on the image signal is the light source L, the light source detected based on the sensor signal is the light source L2, and the category of the light source L1 detected by performing the categorizing process of the light source L1 is the category LC1.

At the positions PS21 and PS22, a region inside the tunnel is largely included in the view angle range of the optical sensor unit 25 indicated by an alternate long and short dash line, and the light source L2 detected based on the sensor signal is discriminated as the "non-natural light." Further, the region inside the tunnel is largely included in the view angle of the imaging unit 23, and the light source L1 detected based on the image signal is discriminated as the "electric bulb-colored illumination." Since the light source L1 is the "electric bulb-colored illumination," the category LC1 is determined as the "non-natural light." As described above, at the positions PS21 and PS22, since the light source L2 and the category LC1 coincide with each other, it is determined that the light-source estimation result of the light source L1 is reliable, and the controller 50 sets the adjustment value of the white balance adjustment while defining, as the light source, the "electric bulb-colored illumination" that is the estimation result of the light source L, and outputs the set adjustment value to the white balance adjustment unit 34, to perform the white balance adjustment.

At the position PS23, the region inside the tunnel is largely included in the view angle range of the optical sensor unit 25 indicated by an alternate long and short dash line, and the light source L2 detected based on the sensor signal is discriminated as the "non-natural light." Further, a region outside the tunnel becomes largely included in the view angle of the imaging unit 23, and the light source L1 detected based on the image signal is changed from the "electric bulb-colored illumination" to the "sunshine." Since the light source L1 is the "sunshine," the category LC1 is determined as the "natural light." As described above, at the position PS23, since the light source L2 and the category LC1 are different from each other, it is determined that the light-source estimation result of the light source L1 is not reliable, and the controller 50 sets the adjustment value of the white balance adjustment while defining, as the light source, the "electric bulb-colored illumination" before the change in category of the estimation result of the light source L1 occurs, and outputs the set adjustment value to the white balance adjustment unit 34, to perform the white balance adjustment.

At the position PS24, the region outside the tunnel becomes largely included in the view angle range of the optical sensor unit 25 indicated by an alternate long and short dash line, and the light source L2 detected based on the sensor signal is changed to the "natural light." Further, since the region outside the tunnel is largely included in the view angle of the imaging unit 23, it is determined that the light source L1 detected based on the image signal is the "sunshine." Since the light source L1 is the "sunshine," the category LC is determined as the "natural light." As described above, at the position PS24, since the light source L2 and the category LC1 coincide with each other, it is determined that the estimation result of the light source L1 is reliable, and the controller 50 sets the adjustment value of the white balance adjustment while defining, as the light source, the "sunshine" that is the estimation result of the light source L, and outputs the set adjustment value to the white balance adjustment unit 34, to perform the white balance adjustment.

At the positions PS25 and PS26, the region outside the tunnel is largely included in the view angle range of the optical sensor unit 25 indicated by an alternate long and short dash line, and the light source L2 detected based on the sensor signal is discriminated as the "natural light." Further, the region outside the tunnel is largely included in the view angle of the imaging unit 23, and the light source L1 detected based on the image signal is discriminated as the "sunshine." Since the light source L1 is the "sunshine," the category LC is determined as the "natural light." As described above, at the positions PS25 and PS26, since the light source L2 and the category LC1 coincide with each other, it is determined that the estimation result of the light source L1 is reliable, and the controller 50 sets the adjustment value of the white balance adjustment while defining, as the light source, the "sunshine" that is the estimation result of the light source L, and outputs the set adjustment value to the white balance adjustment unit 34, to perform the white balance adjustment. Accordingly, according to the present technique, even when only the light source L1 is changed at the position PS23, the white balance adjustment is performed using the adjustment value before the change in category occurs regardless of the estimation result of the light source L. Further, when the light source L2 is changed at the position PS24, and the light source L2 and the category LC1 coincide with each other, it is determined that the estimation result of the light source L1 is reliable, and the balance adjustment of the image signal is performed according to the light-source estimation result based on the image signal.

Therefore, the imaging device 10 can stably perform more accurate white balance adjustment while also considering switching of the light source used upon imaging.

<3. Modifications>

The technique according to the present disclosure can be applied to various fields. For example, the technique according to the present disclosure may be achieved as a device mounted on any mobile body such as an automobile, an electric vehicle, a hybrid electric vehicle, a motorcycle, a bicycle, a personal mobility, an airplane, a drone, a ship, or a robot. Further, the technique according to the present disclosure may be achieved as a device mounted on a portable electronic device such as a smartphone, or may be applied to, for example, a surveillance camera. As described above, when the technique according to the present disclosure is applied to a device having an imaging function usable under an environment where a light source is changed, since white balance adjustment is stably performed, a color of a subject located around a mobile body, a subject to be photographed, or a subject to be monitored can be prevented from being unstably changed due to an influence of, for example, a background.

When RAW data or an image signal before the white balance adjustment and a sensor signal are associated with each other, that is, are recorded in the same recording medium, or both are associated with each other through a communication unit to be output, using a signal recorded in the recording medium or a signal output via the communication unit, the above-described white balance control based on light-source estimation results based on an image signal and a sensor signal can be performed in an off-line process, that is, in the imaging device after imaging, another imaging device, and an image processing device having no imaging function.

In addition, when the RAW data or the image signal before the white balance, the light-source estimation result based on the image signal, and the light-source estimation result based on the sensor signal are associated with each other, the white balance adjustment can be performed in the off-line process.

Furthermore, it is assumed that the optical sensor unit 25 has the view angle serving as the sensing range, which includes the view angle of the captured image obtained by the imaging unit 23 and is wider than that of the captured image. However, the present disclosure is not limited to this, and can be applied to a case where the view angle of the optical sensor unit 25 is not always wider than the view angle of the imaging element. In this case, in a case where the view angle of the captured image becomes narrower than the view angle serving as the sensing range of the optical sensor (by a predetermined value or more) by optically zooming in while driving a zoom lens, the operation of setting the adjustment value of the white balance adjustment according to the present technique may be performed.

A series of processes described in the specification can be performed by hardware, software, or a combined configuration of both. In a case where the processes by software are performed, a program recording a process sequence is installed in a memory in a computer incorporated in dedicated hardware to be executed. Alternatively, the program can be installed in a general-purpose computer capable of performing various processes to be executed.

For example, the program can be recorded in advance in a hard disc, an SSD (Solid State Drive), or a ROM (Read Only Memory) serving as the recording medium. Alternatively, the program can temporarily or permanently be stored (recorded) in a removable recording medium such as a flexible disc, a CD-ROM (Compact Disc Read Only Memory), an MO (Magneto optical) disc, a DVD (Digital Versatile Disc), a BD (Blu-Ray Disc (registered trademark)), a magnetic disc, or a semiconductor memory card. Such a removable recording medium can be provided as what is generally called package software.

Furthermore, the program may be installed from the removable recording medium to the computer, or may be wirelessly or wiredly transferred to the computer from a download site via a network such as a LAN (Local Area Network) or the Internet. The computer can receive the program transferred in this manner and install the program in the built-in recording medium such as a hard disc.

It should be noted that effects described in the present specification are merely illustrative and are not limited. Additional effects not described may be provided. Further, the present technique should not be construed while being limited to the exemplary embodiment of the above-described technique. It is obvious that the exemplary embodiment of this technique discloses this technique in a form of illustration, and those skilled in the art can make modification or substitution of the exemplary embodiment without departing from the gist of this technique. In other words, to determine the gist of this technique, the claims should be taken into consideration.

The image processing device of the present technique can also adopt the following configurations.

(1)

An image processing device including:

a white balance setting unit that sets a white balance adjustment value of an image signal of a captured image generated by photoelectrically converting light from a subject by an imaging element using a light-source estimation result based on the image signal, and a light-source estimation result based on a sensor signal generated by an optical sensor unit upon obtaining the captured image, the optical sensor unit having a wider view angle than that of the captured image and having spectral sensitivity in a region different from that of the imaging element.

(2)

The image processing device according to (1), in which the white valance setting unit determines reliability of the light-source estimation result based on the image signal using the light-source estimation result based on the sensor signal, and sets the white balance adjustment value based on the determination result of the reliability.

(3)

The image processing device according to (2), in which the white balance setting unit classifies the light-source estimation result based on the image signal into any category among categories of a plurality of light sources capable of being estimated based on the sensor signal, and determines the reliability of the light-source estimation result based on the image signal by comparing the category into which the light-source estimation result is classified with the light source estimated based on the sensor signal.

(4)

The image processing device according to (3), in which the white balance setting unit determines that the light-source estimation result based on the image signal is not reliable in a case where a category into which the light-source estimation result is currently classified is changed from a category into which the light-source estimation result is previously classified, but the light source estimated based on the sensor signal is not changed to be a light source equal to the category that into which the light-source estimation result is currently classified, and does not update the white balance adjustment value.

(5)

The image processing device according to (3) or (4), in which the white balance setting unit determines that the light-source estimation result based on the image signal is reliable in a case where a category into which the light-source estimation result is currently classified is equal to the light source estimated based on the sensor signal, and updates the white balance adjustment value according to the current light-source estimation result based on the image signal.

(6)

The image processing device according to any one of (2) to (5), in which, in a case where the imaging element successively generates a plurality of image signals of each image, the white balance setting unit determines the reliability of the light-source estimation result based on a second image signal or following image signals from among the plurality of image signals.

(7)

The image processing device according to any one of (2) to (6), in which the white balance setting unit determines the reliability of the light-source estimation result based on the image signal in a case where a view-angle difference between a view angle of the captured image and a view angle of the optical sensor unit is equal to or greater than a predetermined value.

(8)

The image processing device according to (7), in which the white balance setting unit sets the white balance adjustment value according to the light-source estimation result based on the image signal in a case where the reliability of the light-source estimation result based on the image signal is not determined.

(9)

The image processing device according to any one of (1) to (8), in which the optical sensor unit includes sensitivity in at least an infrared region.

(10)

The image processing device according to any one of (1) to (9), in which the view angle of the optical sensor unit includes the view angle of the captured image.

(11)

The image processing device according to any one of (1) to (10), further including:
a white balance adjustment unit that performs white balance adjustment to the image signal based on the white balance adjustment value.

(12)

The image processing device according to any one of (1) to (11), in which the white balance setting unit sets the white balance adjustment value using the light-source estimation result based on the image signal and the light-source estimation result based on the sensor signal in a case where the view angle of the captured image is wider than the view angle of the sensor signal by a predetermined value or more due to optical zooming.

INDUSTRIAL APPLICABILITY

According to an image processing device, an image processing method, a program, and an imaging device of this technique, a white balance adjustment value of an image signal is set using a light-source estimation result based on the image signal of a captured image generated by photo-electrically converting light from a subject by an imaging element, and a light-source estimation result based on a sensor signal generated by an optical sensor unit upon obtaining the captured image, the optical sensor unit having a wider view angle than that of the captured image and having spectral sensitivity in a region different from that of the imaging element. Therefore, white balance adjustment can be performed stabler than a case where the white balance adjustment value is set based on only the light-source estimation result based on the image signal. Accordingly, this technique is suitable for a device having an imaging function usable under an environment where a change in light source occurs.

REFERENCE SIGNS LIST

10 . . . Imaging device
21 . . . Imaging optical system
22 . . . Imaging optical system driver
23 . . . Imaging unit
24 . . . Light-emitting unit
25 . . . Optical sensor unit
30 . . . Image processor
31 . . . Pre-processor
32 . . . Demosaic processor
33 . . . Linear matrix converter
34 . . . White balance (WB) adjustment unit
35 . . . Aperture correction unit
36 . . . Signal adder
37 . . . γ correction unit
38 . . . Signal converter
41 . . . Recording unit
42 . . . Communication unit
43 . . . View finder
44 . . . Display
45 . . . User interface
50 . . . Controller
410 . . . Recording medium

The invention claimed is:

1. An image processing device, comprising:
a white balance setting unit configured to:
estimate a light source based on a sensor signal to obtain a first light-source estimation result;

classify a second light-source estimation result into a first category from a plurality of categories of a plurality of light sources, wherein
the plurality of light sources includes the light source,
the plurality of light sources is capable of being estimated based on the sensor signal,
the second light-source estimation result is based on an image signal of a captured image,
the image signal of the captured image is generated by photoelectric conversion of light from a subject by an imaging element,
the sensor signal is generated by an optical sensor unit based on the captured image,
the optical sensor unit has a view angle wider than a view angle of the captured image, and
the optical sensor unit has spectral sensitivity in a region different from that of the imaging element;
determine reliability of the second light-source estimation result by comparison of the first category of the second light-source estimation result with the estimated light source;
determine the second light-source estimation result is unreliable in a case where:
the first category into which the second light-source estimation result is currently classified is changed from a second category into which the second light-source estimation result is previously classified, and
the estimated light source is different from a light source corresponding to the first category of the second light-source estimation result, wherein the plurality of categories includes the second category; and
not update a white balance adjustment value of the image signal based on the determination that the second light-source estimation result is unreliable.

2. The image processing device according to claim 1, wherein the white balance setting unit is further configured to:
determine that the second light-source estimation result is reliable in a case where the first category of the second light-source estimation result is equal to the estimated light source; and
update the white balance adjustment value based on the determination that the second light-source estimation result is reliable.

3. The image processing device according to claim 1, wherein, in a case where the imaging element successively generates a plurality of image signals of each image of a plurality of images, the white balance setting unit is further configured to determine the reliability of the second light-source estimation result based on a second image signal of the plurality of image signals or following image signals from the plurality of image signals.

4. The image processing device according to claim 1, wherein the white balance setting unit is further configured to determine the reliability of the second light-source estimation result in a case where a view-angle difference between the view angle of the captured image and the view angle of the optical sensor unit is one of equal to or greater than a determined value.

5. The image processing device according to claim 1, wherein the white balance setting unit is further configured to set the white balance adjustment value based on the second light-source estimation result in a case where the reliability of the second light-source estimation result is not determined.

6. The image processing device according to claim 1, wherein the optical sensor unit has sensitivity in at least an infrared region.

7. The image processing device according to claim 1, wherein the view angle of the optical sensor unit includes the view angle of the captured image.

8. The image processing device according to claim 1, further comprising a white balance adjustment unit configured to execute white balance adjustment to the image signal based on the white balance adjustment value.

9. The image processing device according to claim 1, wherein
the white balance setting unit is further configured to set the white balance adjustment value based on the first light-source estimation result and the second light-source estimation result in a case where the view angle of the captured image is wider than the view angle of the sensor signal, and
the view angle of the captured image is wider than the view angle of the sensor signal by one of a determined value or more due to optical zooming.

10. An image processing device, comprising:
a white balance setting unit configured to:
determine reliability of a first light-source estimation result based on a second light-source estimation result and at least one of a second image signal of a plurality of image signals or following image signals from the plurality of image signals, wherein
the first light-source estimation result is based on an image signal of a captured image,
the second light-source estimation result is based on a sensor signal,
the sensor signal is generated by an optical sensor unit based on the captured image,
the image signal of the captured image is generated by photoelectric conversion of light from a subject by an imaging element,
the imaging element successively generates the plurality of image signals of each image of a plurality of images including the captured image,
the optical sensor unit has a wider view angle than that of the captured image, and
the optical sensor unit has spectral sensitivity in a region different from that of the imaging element; and
set a white balance adjustment value of the image signal based on a result of the determination of the reliability.

11. An image processing device, comprising:
a white balance setting unit configured to:
determine reliability of a first light-source estimation result based on a second light-source estimation result, wherein
the first light-source estimation result is based on an image signal of a captured image,
the second light-source estimation result is based on a sensor signal,
the sensor signal is generated by an optical sensor unit based on the captured image,
the captured image is generated by photoelectric conversion of light from a subject by an imaging element,
the optical sensor unit has a wider view angle than that of the captured image, and
the optical sensor unit has spectral sensitivity in a region different from that of the imaging element; and set a white balance adjustment value of the image signal based on the first light-source estimation result in a case where the reliability of the second light-source estimation result is not determined.

12. An image processing device, comprising:
a white balance setting unit configured to set a white balance adjustment value of an image signal of a captured image based on a first light-source estimation result and a second light-source estimation result in a case where a view angle of the captured image is wider than a view angle of a sensor signal, wherein
the view angle of the captured image is wider than the view angle of the sensor signal by one of a determined value or more due to optical zooming,
the image signal is generated by photoelectric conversion of light from a subject by an imaging element,
the first light-source estimation result is based on the image signal,
the second light-source estimation result is based on the sensor signal,
the sensor signal is generated by an optical sensor unit based on the captured image, and
the optical sensor unit has spectral sensitivity in a region different from that of the imaging element.

* * * * *